United States Patent Office 2,947,776
Patented Aug. 2, 1960

2,947,776

PROCESS OF PREPARING TRIMETHYL BORATE

Stanley J. Chiras, Niagara Falls, N.Y., assignor, by mesne assignments, to Olin Mathieson Chemical Corporation, a corporation of Virginia No Drawing. Filed May 8, 1953, Ser. No. 353,903

1 Claim. (Cl. 260—462)

My invention relates to production of low-boiling esters by esterification of an acid with an alcohol in a continuous processing system. The invention permits realization of a process for continuous production of a low-boiling ester by removing water continuously from the reaction mixture in order to prevent its build-up in the reaction zone, thereby inhibiting the rate of reaction. The process has special applicability to the production of methyl borate from boric acid and methanol.

Although esterification is a reversible equilibrium type reaction, it cannot be carried to completion by simply removing one of the products formed by the esterification reaction. If by-product water is effectively removed, the reaction will proceed to completion, but if only the ester is removed, the water concentrates in the reaction mixture until a point is reached at which the rate of the competing hydrolysis reaction of the ester is approximately equal to the rate of formation of the ester. A displaced equilibrium state is obtained at a point substantially below 100% completion. The displaced equilibrium state, moreover, is approached slowly, ultimately representing only 70–92% conversion of the acid depending on the specific compounds involved. This situation in the practical art has limited commercial production of many esters to batch operations. In the production of high-boiling esters, a combined reaction-distillation system can be employed from which water is continuously removed by distillation. With esters boiling lower than water, however, the water cannot be removed continuously by distillation but tends to build up in the reaction zone so that a continuous esterification process is not feasible. It is necessary, therefore, to resort to special expedients such as the use of azeotroping agents or desiccation.

Preparation of trimethyl borate moreover presents difficulties which are not encountered in the preparation of other esters, including other esters of boric acid, by reason of its volatility, its tendency to azeotrope with methanol and its extreme susceptibility to hydrolysis by moisture. I have found that the rate of esterification of boric acid with methanol is accelerated and that water can be continuously removed to prevent its increase in concentration in the reaction zone by contacting the reaction liquor with an ion exchange resin. Even though the trimethyl borate-methanol azeotrope may be distilled batchwise out of the system so that the reaction can be driven substantially to completion, I have found that the effect of water build-up in the system is to decrease the rate of esterification to a point that a continuous processing system becomes infeasible. According to my invention a continuous process for producing a low-boiling ester is provided by continuously charging an alcohol and an acid to a reaction zone while continuously removing reaction liquor from the reaction zone at a rate preventing undue increase in the concentration of water in the reaction zone and contacting the reaction liquor with an ion exchange resin of the cationic type. The treated reaction liquor then may be returned to the reaction zone from which the low-boiling ester is continuously distilled, or the ester product may be recovered from the treated reaction liquor by distillation before returning incompletely reacted material to the reaction zone.

The usual conditions promoting esterification are maintained in the reaction zone by regulating the ratio of reactants charged to the reaction zone and either preheating the reactants to a desirable temperature level or supplying heat directly or indirectly to the esterification reactor. In many esterification reactions as is known, acid catalysis may be employed with advantage. In the production of trimethyl borate, however, the presence of sulfuric acid appears to exert only a minor influence on the reaction. Maintenance of a substantial molar excess of methanol to boric acid, e.g. greater than about 3 to 1 and preferably about 8 to 1, appears to be the most significant reaction variable.

Although dehydration theoretically might be performed in situ, application in the form of a practical continuous process requires separate reaction and dehydration operations. Although the water by-product can be removed substantially as formed by circulating the entire reaction liquor through the dehydrating zone, it is usually advantageous to take into account equilibrium and rate considerations in order to withdraw and circulate reaction liquor from the reaction zone for product recovery and for circulation through the dehydration zone at a rate maintaining the entire system in balance. The concentration of water in the reaction zone then will be maintained constant at a level determined by the degree to which equilibrium is attained under the reaction conditions and which is consistent with a desirably rapid rate of reaction. Conversion level is controlled to the extent desirable for high rates of throughput and high ultimate yields based on acid conversion. Unconverted material is continuously recycled within the system.

In a preferred application of my invention, the reactants are continuously charged to the reaction zone at a controlled rate, reaction liquor is continuously circulated from the reaction zone through a dehydration zone packed with particles of the ion exchange resin in bed form and returned to the reaction zone, and reaction liquor after the desired degree of reaction equilibrium has been reached is continuously withdrawn to a distillation zone where the ester product is separated by distillation and from which unreacted material is recycled to the reaction zone. In the production of trimethyl borate from boric acid and methanol, the product then is recovered in high concentration as effective fractionation can be applied in the separate distillation zone to strip out a trimethyl borate-alcohol azeotropic composition containing 75 weight percent or more trimethyl borate. Alternatively, however, the product can be distilled continuously from the reaction zone under reflux. Also the reaction liquor can be withdrawn as a single or combined stream to be passed successively through dehydration and distillation zones in whatever sequence is desired for recovery of product and separation of water before recirculation to the reaction zone.

Conducting the process in such a manner accomplishes 100% conversion of the boric acid to the ester. In the continuous process, the equilibrium concentration of reagents and products in the reaction zone at any one instant may vary depending on the total mass of chemicals present, the heat input, the distillation rate, and the composition of the condensed product. When residence times in the reaction zone do not exceed 15 minutes, the instantaneous concentration of ester may represent a conversion of acid of about 2–30%. Although this is the preferred range of operation of a continuous process, the process of the invention may be applied over a much wider range of conditions. For example, the system experiences a wide range of conditions normally in start up and shut down of the process but the product obtained during such conditions is of satisfactory quality.

I have found that ion exchange resins constituting the class of acidic cationic exchange resins are particularly effective in promoting rate of esterification by means of water removal. Sulfonated coal (Zeo-Karb H), for example, is particularly useful. By contrast, I have found that conventional desiccants and adsorbents are significantly less effective and in some cases actually depress esterification rate rather than promote it. A possible explanation may be that the tendency of alcohol to form adsorptive complexes may reduce the activity of materials such as silica gel, activated alumina and calcium sulfate.

In application, the ion exchange resin in particle form is usually arranged in fixed columns or beds in column or tower-type contactors arranged in parallel. The use of at least two beds connected in parallel permits continuous flow of reaction liquor through one of the beds while the other bed is regenerated and presaturated for use. Before contacting the reaction alcohol with the ion exchange resin, it is advantageous to presaturate the resin with the alcohol or the equilibrium reaction mixture. When the life of the resin begins to diminish at an undesirable rate, it may be regenerated by washing or distilling out adsorbed water. For example, a distillate hydrocarbon fraction such as a solvent naphtha may be employed. Skellysolve-C (technical normal heptane) has been successfully employed in regeneration by azeotropic distillation.

The useful resins include, by way of example, various acidic cation exchangers, particularly those of the sulfonated type. Examples include sulfonated coals, e.g. Zeo-Karb H, sulfonated synthetic organic resins such as sulfonated copolymers of styrene and vinyl aromatics, e.g., Amberlite IR-120, sulfonic acid type phenol-aldehyde resins, phenolic methylene sulfonic types.

More specific application of my invention is illustrated in the following examples.

*Example I*

A preheated raw material feeding system was employed consisting of a five liter three-necked flask fitted with a thermowell and separatory funnel. A Glas-Col mantle controlled by a Thermocap relay was used for heating purposes. The raw materials were charged to the reactor through a micro-bellows pump.

The reactor consisted of a glass two-liter resin kettle fitted with a stirrer, thermowell, two offset-adaptors, a distillation head, Friedrichs condenser and a product receiver. The resin kettle was heated by a Glas-Col mantle. The reactor was fitted with liquid inlet and outlet tubes connected to the dehydration system.

Two dehydration units fabricated from 250 mm. x 55 m. Pyrex tubing were connected in parallel. Each unit was assembled by means of two one inch Pyrex pipe flange fittings. This design facilitated the handling of the dehydrating agents. The dehydration units were connected to the reactor through a Sigma motor pump and the recycle line. Installation in parallel permits the regeneration of a dehydrator without interrupting operations.

In a typical experiment, a solution containing one mole of boric acid and 16 moles of methanol is added directly to the reactor. Three liters of a nearly saturated methanol-boric acid solution, 6.38:1

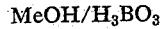

$MeOH/H_3BO_3$ is charged into the preheater by means of a separatory funnel. The Thermocap relay is adjusted so as to maintain the contents of the preheater at 50° C. Each dehydration unit is charged with approximately 225 g. of Zeo-Karb H. The Zeo-Karb H then is saturated with 3.91 moles of methanol. The reactants are cycled then through the unit by a Sigma motor pump and the liquid level is marked. This is done to facilitate the maintenance of the proper liquid level during the reaction. The reaction mixture is heated then to a pot temperature of 64°–68° C., during which time a trimethyl borate-methanol mixture, $b_{760}$ 61.5–64° C., is constantly distilled at an average rate of 180 grams/hour. The distillate contains approximately 31% trimethyl borate by weight. As reactants are consumed in the formation of the product, the volume and composition of the reaction mixture are maintained constant with the make-up feed from the preheated raw material vessel. The flow of the feed make-up is adjusted so as to maintain a constant liquid level in the reaction kettle. Until equilibrium conditions are established in the system, any necessary changes in the feed composition are made by the direct addition of the proper component to the reactor. The feed composition correction is established by the hourly analysis of the TMB-methanol mixture for boron content.

The water formed during the esterification reaction is removed constantly from the reaction mixture as it passes through the dehydrator. The dehydrator units function alternately for one hour periods. The Zeo-Karb H in one dehydrator unit is regenerated while the other unit is in operation. The Zeo-Karb H is regenerated by an azeotropic distillation with approximately 500 ml. of Skellysolve-C (technical normal heptane). The resulting azeotrope separates into two layers. The lower layer, which contains the methanol and water, is constantly withdrawn. The Skellysolve-C in the upper layer is constantly recycled to the pot. The Zeo-Karb H after rinsing with methanol is returned to the dehydrator unit.

*Example II*

In continuous processing tests, the reactor was charged with 37.2 moles of methanol and 2.33 moles of boric acid, and a feed make-up solution containing 5.8 moles of boric acid and 61.3 moles of methanol was placed in a preheated feed make-up vessel. Under the test conditions, the optimum product concentration approached 35% by weight of trimethanol borate. The feed make-up concentration was 15.5% by weight boric acid and the methanol to boric acid ratio was 16:1. A total of 0.93 mole of boric acid and 7.15 moles of methanol was added to the reactor during the course of the reaction to correct fluctuations in the composition of the product. The experiment was continued for 3.87 hours during which time 699.3 grams of trimethylborate-methanol mixture, $b_{760}$ 61.5–64° C. was collected. The product averaged 31.2% by weight trimethyl-borate for a yield of 2.1 moles. Based on 2.16 moles of boric acid consumed, the yield was 98%.

The Zeo-Karb H was regenerated hourly using Skellysolve-C. Analysis of the combined methanol-water layers indicated that 5.35 moles of water was removed from the reactor by the Zeo-Karb H. At the completion of the experiment, 0.94 mole of water remained in the reaction mixture. Eighty-five percent of the water formed in the esterification reaction was removed by the dehydrating agent. The 85% removal of water however is only a limitation of the particular reaction conditions and equipment chosen and is not a limitation of the process itself. Circulation of the reaction mixture through the dehydrating agent at higher rates and/or longer contact times, for example, will remove substantially all of the water formed in the reaction.

In a series of batch experiments conducted to evaluate the effect of the cation exchanger, 50% conversion was reached in 38 minutes employing Zeo-Karb H for dehydration at 68°–101° C. and 6.88 methanol to boric acid ratio whereas 50% conversion without dehydration by the cation exchanger required 93 minutes at 68°–110° C. and 8.02 methanol to boric acid ratio.

The process is similarly applicable with advantage to the production of other low-boiling esters from acids or alcohols, low-boiling alcohol azeotropes, particularly to the production of esters that are highly sensitive to water. Examples of esters boiling at lower temperature than water include: methyl, ethyl and isopropyl formates; methyl, ethyl and vinyl acetates; methyl chloroformate; methyl propionate; methyl carbonate; methyl isobutyrate as well as lower alkyl esters of inorganic acids such as propyl nitrite, ethyl nitrate, and the like.

I claim:

A continuous process for the production of trimethyl borate by reaction of boric acid with excess methanol wherein water is formed in the reaction liquor and the trimethyl borate is removed by distillation which comprises continuously charging boric acid and methanol to a heated reaction zone, continuously removing a portion of the reaction liquor from the reaction zone, removing water from the reaction liquor removed from the reaction zone by contacting the liquor with an ion exchange sulfonated cationic resin, and recycling dehydrated reaction liquor to the reaction zone.

References Cited in the file of this patent

UNITED STATES PATENTS

| | | |
|---|---|---|
| 2,088,935 | Vaughn | Aug. 3, 1937 |
| 2,217,354 | Appel | Oct. 8, 1940 |
| 2,599,757 | Gottfried | June 10, 1952 |
| 2,629,735 | Cottle | Feb. 24, 1953 |

OTHER REFERENCES

Sussman: 38, Ind. and Eng. Chem., No. 12, pages 1228–30. 260-Base Exchange.